US012613314B2

(12) United States Patent
Nguyen et al.

(10) Patent No.: US 12,613,314 B2
(45) Date of Patent: Apr. 28, 2026

(54) FALSE TARGETS CAUSED BY REFLECTION POSITION DETERMINING SOLUTION AND SYSTEM FOR SECONDARY SURVEILLANCE RADAR

(71) Applicant: VIETTEL GROUP, Ha Noi City (VN)

(72) Inventors: Manh Thang Nguyen, Ha Noi City
(VN); Nhu Thanh Nguyen, Ha Noi
City (VN); Duy Khanh Do, Ha Noi
City (VN); Manh Tua Nguyen, Ha Noi
City (VN); Xuan Thanh Le, Ha Noi
City (VN)

(73) Assignee: VIETTEL GROUP, Ha Noi City (VN)

( * ) Notice: Subject to any disclaimer, the term of this
patent is extended or adjusted under 35
U.S.C. 154(b) by 327 days.

(21) Appl. No.: 18/347,428

(22) Filed: Jul. 5, 2023

(65) Prior Publication Data

US 2024/0036167 A1     Feb. 1, 2024

(30) Foreign Application Priority Data

Jul. 29, 2022     (VN) ............................... 1-2022-04831

(51) Int. Cl.
*G01S 7/41*       (2006.01)
*G01S 7/295*      (2006.01)
*G01S 7/35*       (2006.01)
*G01S 13/42*      (2006.01)

(52) U.S. Cl.
CPC .............. *G01S 7/415* (2013.01); *G01S 7/295*
(2013.01); *G01S 7/354* (2013.01); *G01S*
*13/426* (2013.01)

(58) Field of Classification Search
None
See application file for complete search history.

(56) References Cited

U.S. PATENT DOCUMENTS

| | | | |
|---|---|---|---|
| 2002/0180631 A1* | 12/2002 | Alon ....................... | G01S 13/91 |
| | | | 342/107 |
| 2013/0229297 A1* | 9/2013 | Mukai ..................... | G01S 13/42 |
| | | | 342/92 |
| 2022/0011423 A1* | 1/2022 | Li ........................... | G01S 7/023 |
| 2024/0192355 A1* | 6/2024 | Zhang ................... | G01S 7/2883 |

* cited by examiner

*Primary Examiner* — William Kelleher
*Assistant Examiner* — Ismaaeel A. Siddiquee
(74) *Attorney, Agent, or Firm* — patenttm.us

(57)     ABSTRACT

The invention proposes False targets caused by reflection
position determining system and solution for the SSR which
helps determine reflected real target's coordinate, reflector's
coordinate and features, coordinate and features of the false
target (multipath target) and using these data as the basis to
build up the multipath target suppressing system, guaran-
teeing the detecting ability of the radar. The proposed system
contains: Input data generating component; False target
position (multipath position) determining component;
Reflected signal power comparison calculating component;
Displaying and data transferring component; Reflected mul-
tipath targets suppressing component. The proposed mea-
sure includes 5 steps: Step 1: generating input data for the
multipath position determining system; step 2: determining
the position of the target's ghost; step 3: comparing the
signal power; step 4: displaying and false target information
(position, power) transferring; step 5: applying multipath
suppressing algorithm on the SSR.

1 Claim, 5 Drawing Sheets

FALSE TARGETS CAUSED BY REFLECTION POSITION DETERMINING SOLUTION AND SYSTEM FOR SECONDARY SURVEILLANCE RADAR

FIELD OF THE INVENTION

The invention is related to the system and solution to determine the position of false targets caused by reflection in secondary surveillance radar (SSR). The mentioned solution and system are applied in the SSR system.

BACKGROUND OF THE INVENTION

In stereo systems, especially in radar systems, the electromagnetic radiation in space received by radar is the sum-up of radiations from several directions caused by reflection, refraction, and diffusion as reacting with obstacles.

Practically, the environment surrounding radar often includes obstacles causing reflection of radar radiation (mountainous landscape, vegetation, tall buildings, metal infrastructure, etc). As for the SSRs using complex signals with phase and frequency modulation, the reflected signals which are attenuated, delayed, and phase-shifted can be easily removed. However, as for the SSRs using single pulses without the phase or carrier frequency relation, it is more difficult to eliminate multipath signals. In the case as the interrogating signal from the SSR's main lobe is reflected from obstacles to the airplane, if this reflected signal is strong enough, the airplane receiving it will radiate the answer signal without being interrogated in a direct path. This causes the multipath phenomenon in radar.

Thus, it is necessary to research and propose a system to determine the positions where the multipath phenomenon often occurs in the field. This will set a base to build up a multipath suppressing system to guarantee the detecting ability of the SSR. There have been several independent research about electromagnetic signals' reflection in space, these research has pointed out the principles and related formulas. The invention of multipath targets position determining system and method for the SSR is based on those principles and formulas about reflection geometry, free-space path power loss, reflection power loss, and radar's specific features (transceiving system, antenna).

SUMMARY OF THE INVENTION

The first purpose of the invention is to propose a system to determine the multipath targets' position caused by reflection for the SSR in order to provide the information for the false targets suppressing system. To achieve this purpose, the proposed system includes 5 major components: Input data generating component, False target position determining component, Reflected signal power comparison calculating component, Displaying and transferring component, Reflected multipath targets suppressing component, to be specific:

Input data generating component generates the input information for the system, including real target's information and reflectors' information.

False target position (multipath position) determining component determines the exact coordinate of the false target caused by reflectors as the airplane flies across the reflected site.

Reflected signal power comparison calculating component calculates the power loss of the RF signal from the airplane as the signal goes through radiating space and is reflected on different reflectors with different features.

Displaying and data transferring component plots and displays the false target's position on the console screen along with real target and reflectors coordinates; simultaneously plots the 3D figure the relative power of the reflected signal (within 2 dimensions: range and azimuth); get data about position, timing, and power of all potential multipath false targets calculated to set up the parameters for false target suppressing component.

Reflected multipath target suppressing component executes the multipath suppressing algorithm, only allowing the real target's signal through. The suppressing algorithm uses the comparison of power and time between the received signal in the main channel and the received signal in the suppressing channel. The output is then sent to the following component—the target detecting component.

The second purpose of the invention is to propose a method to determine the multipath targets' position caused by reflection for the SSR. To achieve this purpose, the proposed measure includes these following steps:

Step 1: Generating input data for multipath position determining system. This step provides the system with the input information of the real target and reflectors.

Step 2: Determining the position of the target's ghost (false target). This step determines the potential reflected target's position (range, azimuth); reflector's parameters (range, azimuth, size, direction), and potential false target position (range, azimuth).

Step 3: Comparing the signal power. At this stage, the power comparison is executed between direct signal power and reflected signal power based on the coordinates and features of the reflector.

Step 4: Displaying and data transferring: determine whether there is a false target or not, get the information of the false target (position, power), display on the console information about real target, reflector and ghost, and transfer the false target's data to the following component.

Step 5: Applying the algorithm to the SSR. In this step, the suppressing algorithm is executed based on the data provided in Step 4.

DETAILED DESCRIPTION OF THE INVENTION

Figure 1:
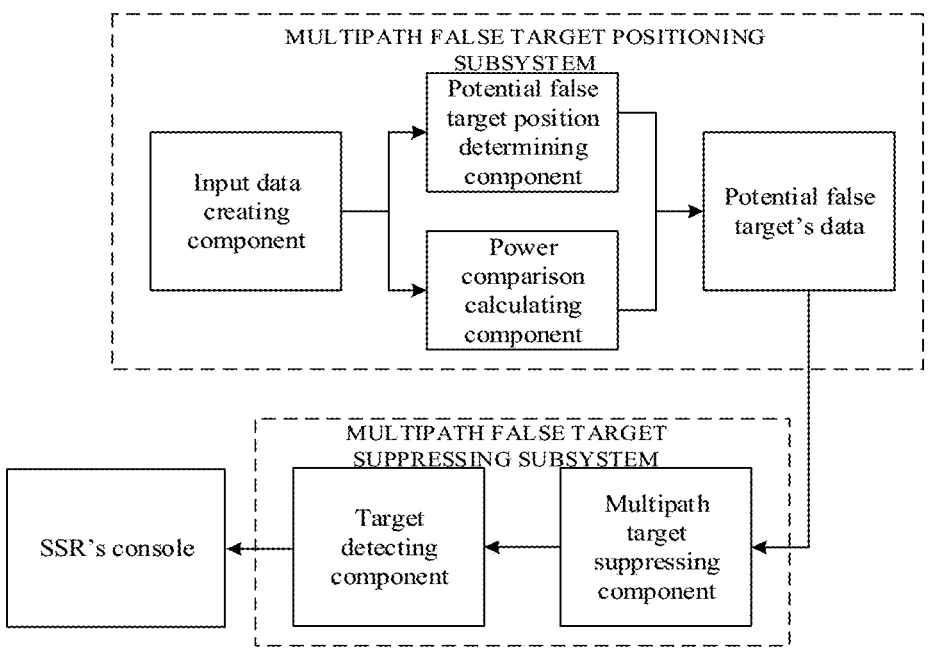
FIG. 1: Diagram of False targets caused by reflection position determining system.

The system's structure is described in FIG. 1, the system includes the following components:

Input data generating component generates the input information for the system, including real target's information and reflectors' information.

False target position (multipath position) determining component determines the exact coordinate of the false target caused by reflectors as the airplane flies across the reflected site.

Reflected signal power correlation calculating component calculates the power loss of the RF signal from the airplane as the signal goes through radiating space and is reflected on different reflectors with different features.

Displaying and data transferring component plots and displays the false target's position on the console screen along with real target and reflectors coordinates; simultaneously plots the 3D figure the relative power of reflected signal (within 2 dimensions: range and azimuth); get necessary data about position, timing, and power of all potential multipath false targets calculated to set up the parameters for false target suppressing component.

Reflected multipath target suppressing component executes the multipath suppressing algorithm, only allowing the real target's signal through. The suppressing algorithm uses the comparison of power and time between the received signal in the main channel and the received signal in the suppressing channel. The output is then sent to the following component—the target detecting component.

False target caused by reflection position determining solution includes these following steps:

Step 1: Generating Input Data for Multipath Position Determining System;

This step provides the system with the input information of the real target and reflectors. The input data includes the information of the real target and information of the reflector. The real target's information includes the area of range and azimuth where the airplane flies (data received from the SSR system). The information about the reflector includes the reflector's size, range and azimuth, surface material, and the scattering of the reflecting surface (the data is provided by surveying the surrounding landscape of the SSR within the observing field of the radar). Besides, the data also includes the information about antenna's beam width, sweeping speed (data provided by the SSR); radar cross section, and target's average speed (data from references about airplanes' types).

Step 2: Determining the Position of the Target'S Ghost

This step is proceeded in the False target position (multipath position) determining component. Based on the input system parameters, the multipath position and the reflected site are calculated.

Figure 2:
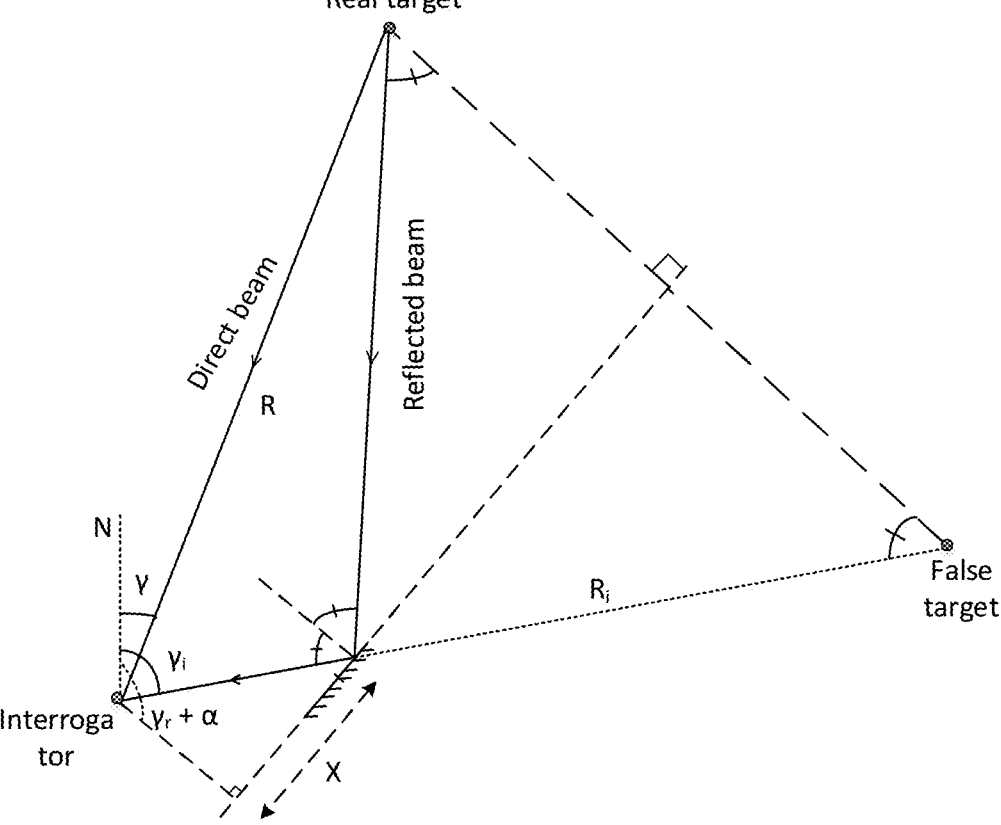
FIG. 2: Illustration of the principle to determine multipath target position.

Based on the geometrical similarity, we can apply the knowledge about mirror reflection to the multipath phenomenon. Consider the real target radiates answer signal from the range R, azimuth $\gamma$ giving the false target at range $R_i$, azimuth $\gamma_i$ as following (FIG. 2):

$$\begin{cases} R_i = \dfrac{2 \cdot R_r\cos\alpha - R\cos(\gamma_r + \alpha - \gamma)}{\cos(\arctan\tilde{X})} \\ \gamma_i = \gamma_r + \alpha - \gamma - \arctan\tilde{X} \end{cases}$$

Where: $\tilde{X} = \dfrac{X}{R_r\cos\alpha} = \dfrac{R \cdot \sin(\gamma_r + \alpha - \gamma)}{2 \cdot R_r\cos\alpha - R\cos(\gamma_r + \alpha - \gamma)}$ With:

$\alpha$ is the angle between the surface and the normal line;

$\gamma_r$ is the azimuth of the reflector (from the horizontal center point of the surface);

$R_r$ is the range of the reflector (from the horizontal center point of the surface);

X is the distance from the reflected point on the reflecting surface to the end of the normal line on the surface (the normal line drawn from the radar to the plane which includes the reflecting surface);

$\tilde{X}$ is set as a variable to shorten the formula.

Figure 3:
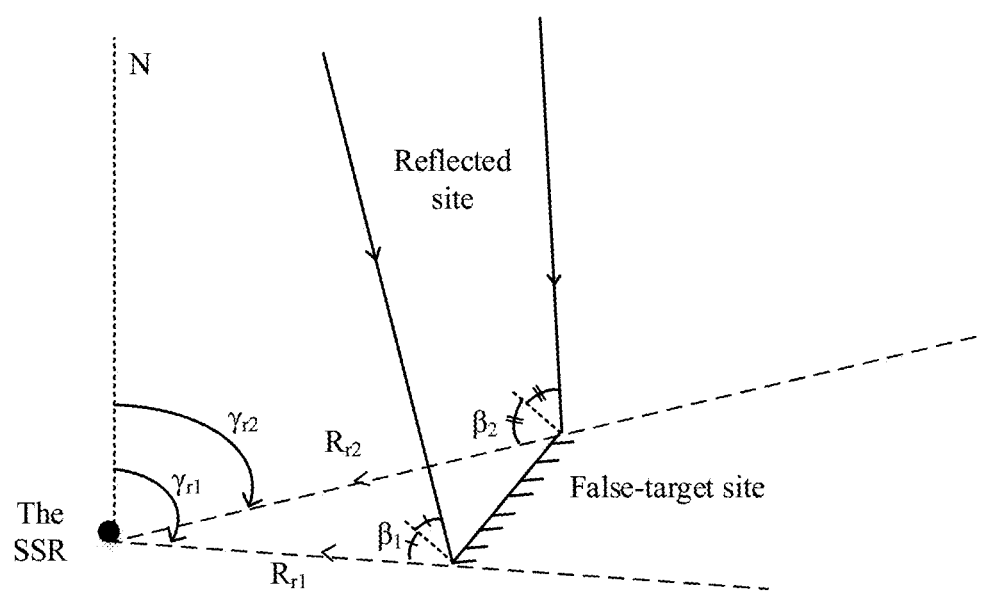
FIG. 3: Illustration of the principle to determine the reflected site and the false-target site.
Figure 4:
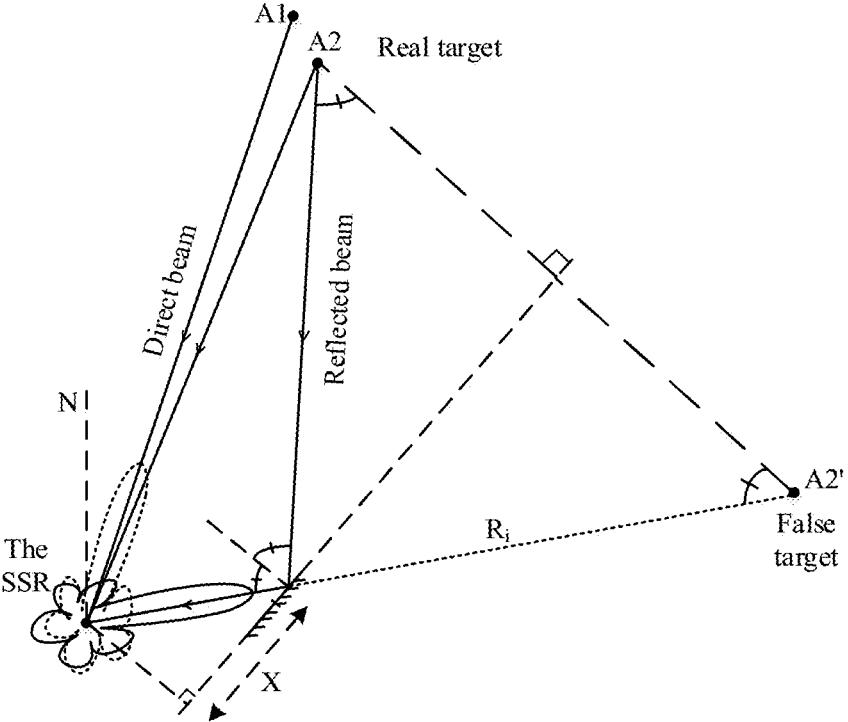
FIG. 4: Illustration of the multipath phenomenon (caused by reflection) in the SSR.

With reflection principles and related formulas, the reflected site as the airplane flies in and the consequent false-target site are calculated (FIG. 3).

The false-target site satisfies the following conditions:

$$\begin{cases} \gamma_{r2} \leq \gamma_i \leq \gamma_{r1} \\ R_i > R_{i\_lim} \end{cases}$$

In which:

$$R_{r1} = \sqrt{R_r^2 d^2/4 - R_r d\sin\alpha}$$

$$\beta_1 = \arcsin\left(\frac{2R_r\sin\alpha - d}{2R_{r1}}\right)$$

$$R_{r2} = \sqrt{R_r^2 d^2/4 + R_r d\sin\alpha}$$

$$\beta_2 = \arcsin\left(\frac{2R_r\sin\alpha + d}{2R_{r2}}\right)$$

$$\gamma_{r1} = \gamma_r + \arccos\left(\frac{2R_r - d \cdot \sin\alpha}{2R_{r1}}\right)$$

$$\gamma_{r2} = \gamma_r - \arccos\left(\frac{2R_r + d \cdot \sin\alpha}{2R_{r2}}\right)$$

$$R_{i\_lim} = \frac{\cos\beta_1 \cdot R_{r1}}{\cos(\beta_1 + \gamma_{r1} - \gamma_i)}$$

The reflected site is where when airplanes fly into, their answer signal may be reflected to the SSR causing multipath. The site satisfies:

$$\begin{cases} \begin{cases} (\pi - \gamma_{r1} - 2\beta_1) \leq \gamma \leq \gamma_{r2} \\ R_{lim1} \leq R \leq R_{lim2} \end{cases} \\ \begin{cases} \gamma_{r2} \leq \gamma \leq \gamma_{r1} \\ R_{lim1} \leq R \leq R_{lim3} \end{cases} \end{cases}$$

In which:

$$R_{lim1} = \frac{\sin(2\beta_1) \cdot R_{r1}}{\sin(\gamma_{r1} - \gamma + 2\beta_1)}$$

$$R_{lim2} = \frac{\sin(2\beta_2) \cdot R_{r2}}{\sin(\gamma_{r2} + \gamma - 2\beta_2)}$$

$$R_{lim3} = \frac{\cos\beta_2 \cdot R_{r2}}{\cos(-\gamma_{r2} + \gamma - \beta_2)}$$

With:

$R_{lim1}$, $R_{lim2}$, $R_{lim3}$ is the range limits depending on the target's azimuth;

$\gamma$ is the target's azimuth;

$\gamma_{r1}$, $\gamma_{r2}$ are the azimuths of the right edge and left of the reflecting surface, respectively;

$R_{r1}$, $R_{r2}$ are the ranges of the right and left edges of the surface, respectively;

$\beta_1$, $\beta_2$ are the arriving angles of the reflected signal on the right and left edge of the surface to the radar.

In calculating the reflected site, it is necessary to consider the speed, direction of the airplane, and the sweeping speed of radar. Thus, to determine the position where airplane causes false target, we need to interpolate between the two positions where airplane is spotted on the radar in the two consecutive scanning circles.

Figure 5:
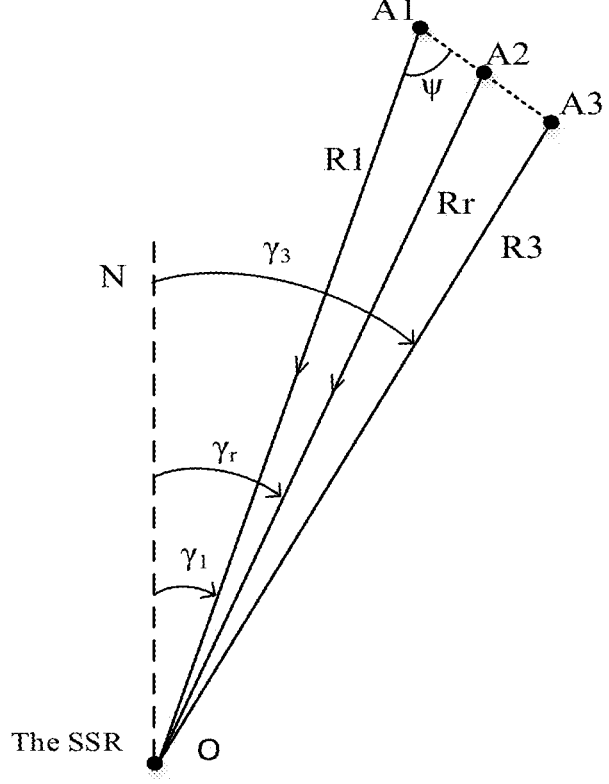
FIG. 5: Illustration of the principle to determine multipath target position considering interpolation.

Consider the $k_{th}$ cycle in which radar detects the real target at A1 (azimuth $\gamma_1$; range $R_1$) and the false target at A2' (azimuth $\gamma_1$). In the next cycle ($(k+1)_{th}$ cycle), the radar detects the real target at A3 (azimuth $\gamma_3$; range $R_3$) (FIG. 5). Suppose that the signal transmitting time is instant, we can interpolate the range $R_x$ and azimuth $\gamma_x$ of the plane when the false target is detected.

Set:

$\Delta t_{1i}$ is the time in which the antenna turns from $\gamma_1$ to $\gamma_i$;

$\Delta t_{13}$ is the time between the two consecutive times the real target is detected;

$\eta$ is the angle between the line linking the two positions A1-A3 and the line linking A1-radar center as FIG. 5. We have:

$$A_1 A_2 = \frac{\Delta t_{1i}}{\Delta t_{13}} A_1 A_3$$

The interpolated target position is:

$$Rx = \sqrt{R1^2 + A_1 A_2^2 - 2 \cdot R1 \cdot A_1 A_2 \cdot \cos \eta}$$

$$\gamma_x = \gamma_1 + \arcsin\left(\frac{A_1 A_2 \cdot \sin \eta}{Rx}\right)$$

Step 3: Calculating the Power Correlation;

This step is proceeded in the Reflected signal power correlation calculating component. In space, as the signal is deflected by reflection, refraction, or scattering, it may cause the multipath issue. As for the multipath reflected signal in the SSR, the RF signal is attenuated as compared to the direct signal, but still strong enough to cause multipath false targets.

The power loss of the RF signal is calculated using formulas of free-space path loss and reflection coefficient of the reflecting surface.

The free-space path loss formula:

$$\Delta L = 20 \cdot \log(R) + 20 \cdot \log(f) - 147.5$$

In which:

R[m] is the range of the target;

f[Hz] is the signal frequency.

The reflection coefficient is calculated as follows:

$$\rho = \rho_0 \rho_s \rho_v$$

As:

$\rho_0$ is the Fresnel reflection coefficient;

$\rho_s$ is the rough surface's reflection coefficient;

$\rho_v$ is the vegetation's reflection coefficient.

With $\Gamma$ as the complex Fresnel reflection coefficient, we have: $\rho_0 = |\Gamma|$ Because the response signal of the transponder is vertical polarization (V polarization), we can use the following formula:

$$\Gamma_V = \frac{\varepsilon \cdot \sin\Psi - \sqrt{\varepsilon - \cos^2\Psi}}{\varepsilon \cdot \sin\Psi + \sqrt{\varepsilon - \cos^2\Psi}}$$

Where:

$\Psi$ is the grazing angle—the angle between the arriving beam and the reflecting surface ( $$\Psi = \frac{\pi}{2} - \beta,$$

với $\beta$ is the arriving angle of the reflected beam at the reflecting surface);

$\varepsilon$ is the complex dielectric constant of the surface material, $\varepsilon = \varepsilon_r + j\varepsilon_j$;

$\varepsilon_r$ is the relative dielectric constant of the reflecting surface;

$\varepsilon_j = -j \cdot 60 \cdot \lambda \sigma_e$, $\sigma_e[\mho/m]$ is the surface material conductivity;

$\lambda[m]$ is the signal's wavelength.

As for rough surfaces, the specular scattering coefficient is as follows:

$$\rho_s = exp\left[-\frac{1}{2}\left(\frac{4\pi\sigma_h}{\lambda}\sin\Psi\right)^2\right]$$

Where:

$\sigma_h$ [m] is the root-mean-square (rms) height deviation of the surface relative to its mean;

$\lambda$ [m] is the signal's wavelength;

$\Psi$ is the grazing angle—the angle between the arriving beam and the reflecting surface ( $$\Psi = \frac{\pi}{2} - \beta,$$

with $\beta$ is the arriving angle of the reflected beam at the reflecting surface).

Vegetation's reflection coefficient is given by:

$$\rho_v = \left(1 - \sqrt{a\lambda}\right)\exp\left(-\frac{b \cdot \sin\Psi}{\lambda}\right) + \sqrt{a\lambda} \leq 1, 0$$

Where: a, b are coefficients depending on the type of vegetation

Some vegetation types and their corresponding a, b are as follows:

| Vegetation type | a | b |
|---|---|---|
| Thin grass | 3.2 | 1 |
| Dense grass, bush | 0.32 | 3 |
| Dense trees | 0.032 | 5 |

Step 4: Displaying and False Target Information (Position, Power) Transferring;

This step is executed in the Displaying and data transferring component.

Figure 6:
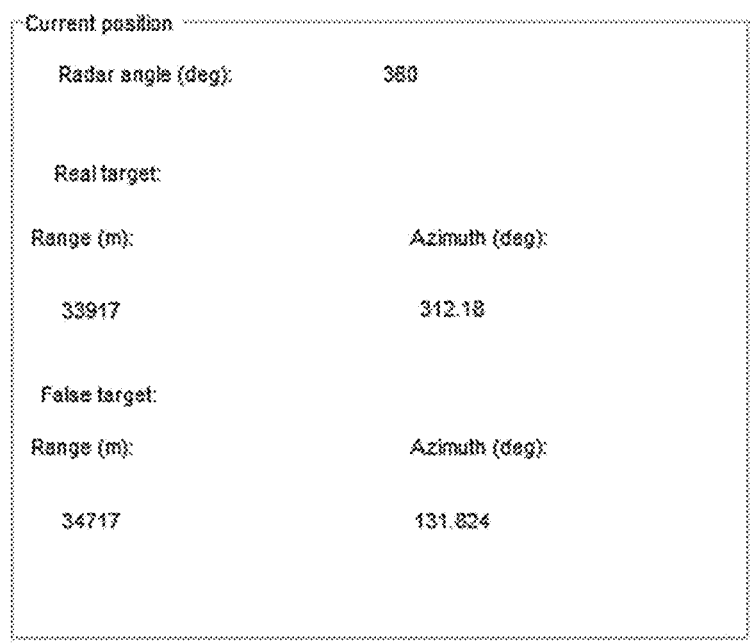
FIG. 6: Data displaying interface.
Figure 6:
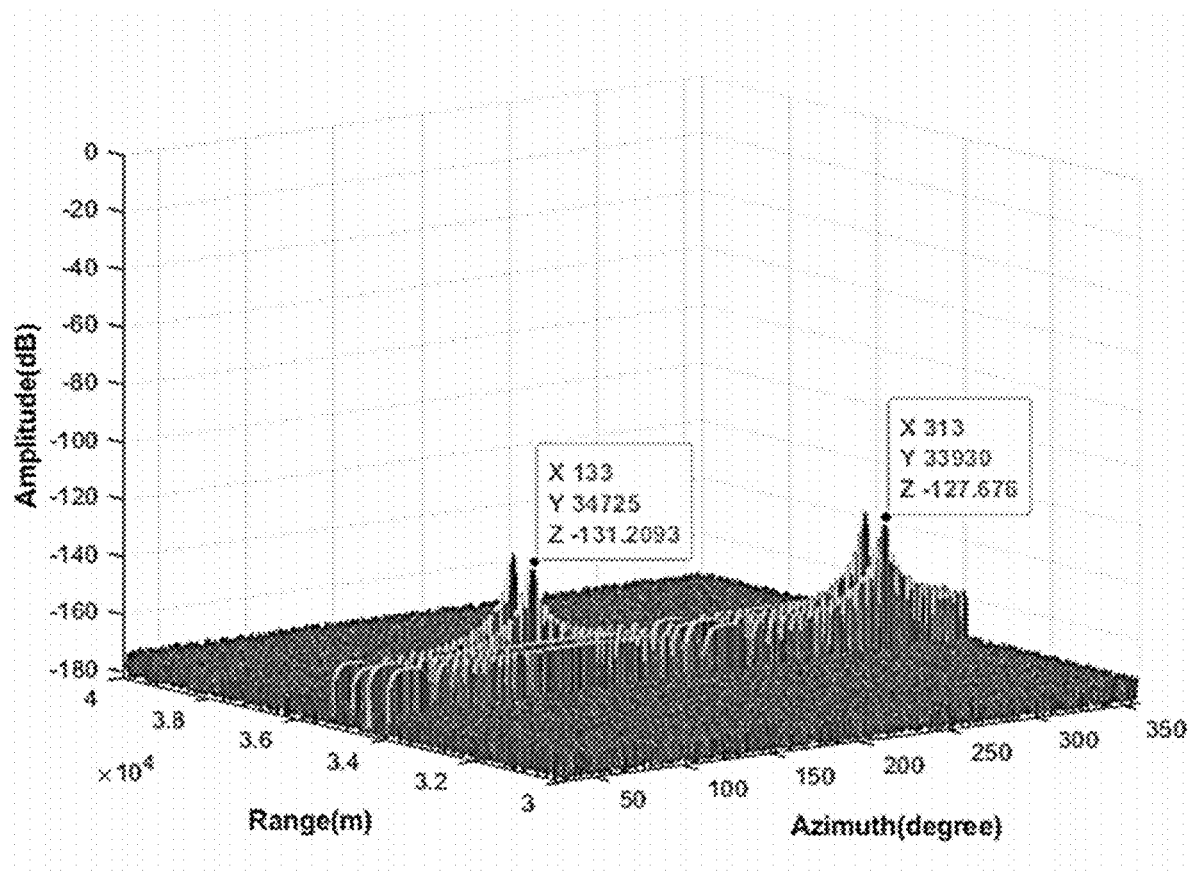

Considering FIG. 6, the Displaying and data transferring component show on the interface the input parameters of the reflected real target, the reflector, and calculated parameters of the false target.

The interface allows us to survey several flying targets with several types of landscape along with different reflecting surface features. It also visualizes the multipath phenomenon with airplane position, reflector, and false target (if there is one) on the monitor.

Plot and export the 3D figure of the received signal amplitude in two dimensions: range and azimuth with optional axes limits, allowing saving and interacting with the figure.

Continuously update information about scanning angle, real targets, and false targets (if there are) and report whether there are false targets or not.

This surveyed information is used as the basis for the false target suppressing system of the SSR.

Figure 7:
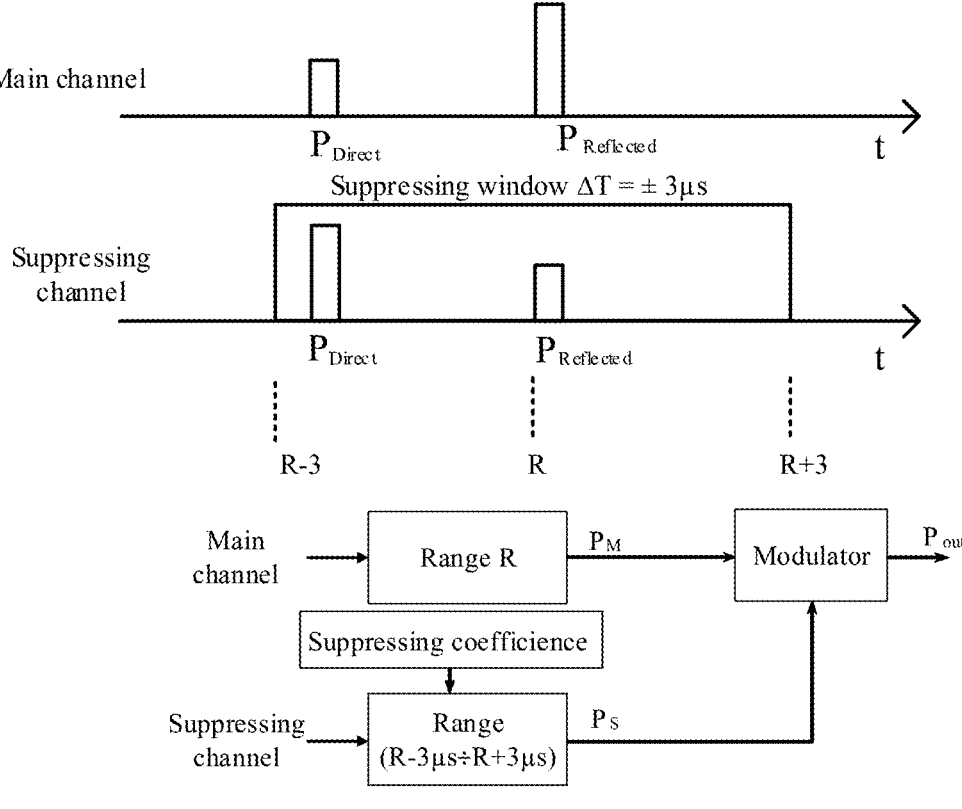
FIG. 7: Diagram of False target suppressing algorithm.

Step 5: Applying multipath suppressing algorithm on the SSR;

This step is executed in Reflected multipath targets suppressing component. Using the reflected false target suppressing algorithm shown in FIG. 7. Based on multipath position information and power comparison, we can calculate the suitable parameters for the suppressing system.

The reflected multipath target suppressing algorithm compares the power of the main channel at the range R with the adjacent area (suppressing window) of the suppressing channel (the SSR system uses two simultaneous channels: main channel and suppressing channel). The range suppressing window is calculated based on practical information from the airplane and false target determining system, this window's parameters are changeable.

The range suppressing window's parameters are often set as follows:

Suppressing window: $\Delta t < \leq 3$ µs.

Suppressing power condition: $P_M \geq P_S + 9$ dB

Signal after suppressing is transferred to the next stage, which is the Target detecting component, to process, decode and extract information for the radar system.

EFFICIENCY OF THE INVENTION

The False targets caused by reflection position determining solution and system for the SSR have been tested and assessed. The result is as follows:

Multipath false target data creating and sampling ability: The data created by the multipath false target positioning component totally match the practical data Multipath false target suppressing ability: 100% unwanted multipath targets at a range greater than resolution are eliminated.

The invention claimed is:

1. A method of determining false target positions caused by reflection comprising the following steps:

step 1: generating input data for a multipath position determining system; performed within an input data generating component and provides input information of a real target and reflectors, the information of the real target includes an area of range and azimuth where an airplane flies received from a secondary surveillance radar (SSR) system, the input information about the reflector includes the reflector's size, range and azimuth, surface material, and scattering of a reflecting surface provided by surveying a surrounding landscape of the SSR within an observing field of the radar the information also includes information about an antenna beamwidth, a sweeping speed data provided by the SSR; a radar cross section, and a target average speed data from references about airplanes' types;

step 2: determining a position of a ghost of the real target in a false target position determining component;

based on input system parameters, including geometrical similarity, using mirror reflection principles to approach a multipath phenomenon, the real target radiates an answer signal from a range R, azimuth $\gamma$ giving the false target at range $R_i$, azimuth $\gamma_i$ as follows:

$$\begin{cases} R_i = \dfrac{2R_r\cos\alpha - R\cos(\gamma_r + \alpha - \gamma)}{\cos(\arctan\tilde{X})} \\ \gamma_i = \gamma_r + \alpha - \gamma - \arctan\tilde{X} \end{cases}$$

where:

$$\tilde{X} = \frac{X}{R_r\cos\alpha} = \frac{R\cdot\sin(\gamma_r + \alpha - \gamma)}{2\cdot R_r\cos\alpha - R\cos(\gamma_r + \alpha - \gamma)}$$

with:

α is the angle between the reflecting surface and a normal line;

$\gamma_r$ is the azimuth of the reflector (from a horizontal center point of the reflecting surface);

$R_r$ is a range of the reflector (from the horizontal center point of the reflecting surface);

X is the distance from a reflected point on the reflecting surface to an end of the normal line on the reflecting surface, the normal line drawn from the radar to a plane which includes the reflecting surface;

with reflection principles and related formulas, calculate a multipath position and a reflected site;

to determine the reflected site, determine a speed, direction of the airplane, and a sweeping speed of radar, a position where the airplane causes the false target is interpolated between two positions where the airplane is spotted on the radar in two consecutive scanning circles;

step 3: calculate a power correlation between the real target and the false target;

as for the multipath reflected signal in the SSR, the multipath reflected signal is attenuated as compared to a direct response signal from the target, but still strong enough to cause multipath false targets;

a power loss of the multipath reflected signal is calculated using formulas of free-space path loss and reflection coefficient of the reflecting surface, wherein the free-space path loss formula comprises:

$$\Delta L = 20\cdot\log(R) + 20\cdot\log(f) - 147,5$$

in which:

R[m] is a range of the target;

f[Hz] is a signal frequency, the reflection coefficient is formula comprises:

$$\rho = \rho_0\rho_s\rho_v$$

as:

$\rho_0$ is a Fresnel reflection coefficient;

$\rho_s$ is a rough surface's reflection coefficient;

$\rho_v$ is a vegetation's reflection coefficient;

step 4: displaying and transferring false target information including position and power; in a displaying and data transferring component, wherein the displaying and data transferring component show on an interface input parameters of the reflected real target, the reflector, and calculated parameters of the false target, the interface enables to survey several flying targets with several types of landscape along with different reflecting surface features, it also visualizes the multipath phenomenon with airplane position, reflector, and any false target on a monitor, plot and export a 3D figure of a received signal amplitude in two dimensions: range and azimuth with optional axes limits, allowing saving and interacting with the 3D figure;

continuously update information about scanning angle, real targets, and any false targets and report whether there are false targets or not;

using information from the surveay as a basis for a false target suppressing system of the SSR;

step 5: applying a multipath suppressing algorithm on the SSR; in a reflected multipath targets suppressing component, using a reflected false target suppressing algorithm, based on multipath position information and power comparison, calculate the parameters for the false target suppressing system, the multipath suppressing algorithm compares a power of a main channel at a range R with an adjacent area of a suppressing channel, a range suppressing window is calculated based on information from the airplane and the false target determining system, the range suppressing window's parameters are changeable;

wherein the range suppressing window's parameters are set as follows:

+ suppressing window: $\Delta t \leq 3$ μs
+ suppressing power condition: $P_M \geq P_S + 9$ dB, where $P_M$ is the power of the main channel and $P_s$ is a power of the suppressing channel signal after suppressing is transferred to a next stage, which is a target detecting component, to process, decode and extract information for the radar system.

* * * * *